Sept. 4, 1945.                    G. SPERTI                    2,384,203
                        IRRADIATION PROCESS AND MEANS
                             Filed Aug. 9, 1940
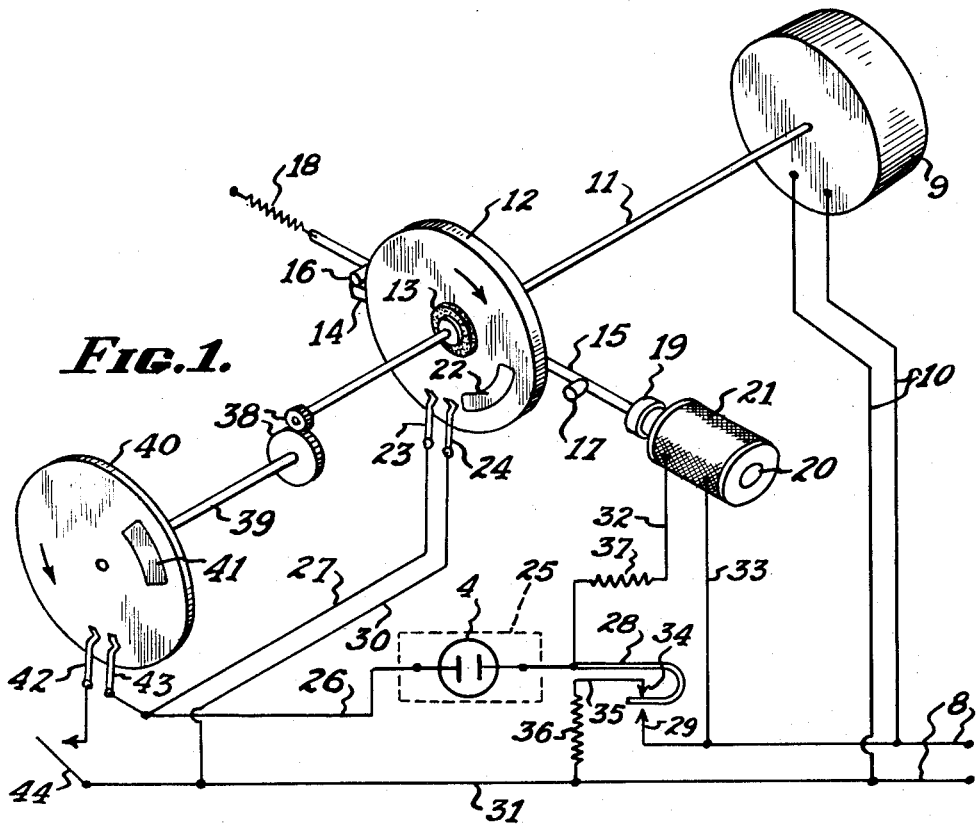
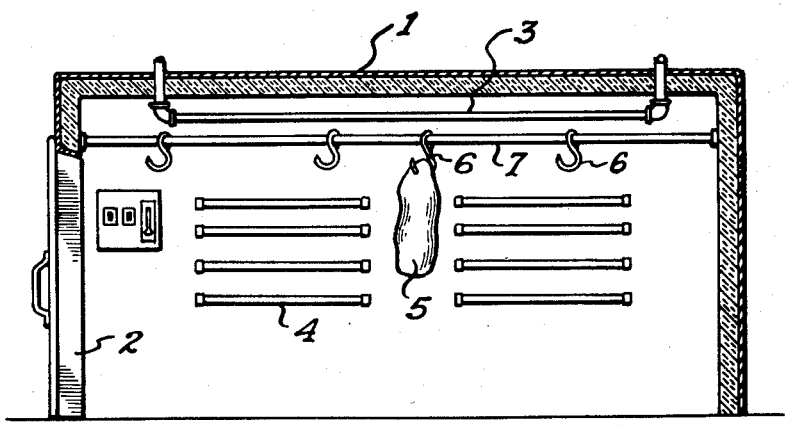
INVENTOR.
GEORGE SPERTI.
BY  Allen & Allen
                        ATTORNEYS.

Patented Sept. 4, 1945

2,384,203

UNITED STATES PATENT OFFICE 2,384,203

IRRADIATION PROCESS AND MEANS

George Sperti, Covington, Ky., assignor to Science Laboratories, Inc., Norwood, Ohio, a corporation of Ohio Application August 9, 1940, Serial No. 352,004

21 Claims. (Cl. 99—218)

My invention relates to a new process and means for the irradiation of food stuffs, and I shall describe it in connection with the treatment of meats. It will be clear to the skilled worker in the art how the teachings of the process may be applied to similar problems in connection with the treatment of other materials.

In the treatment of meats, a problem of storage without deterioration is involved even in ordinary distribution in retail markets; and frequently there is a problem of cold storage for long periods of time. Also there is frequently a problem of tenderizing which differs from mere storage, although it may be concurrent therewith. My teachings herein apply to either or both.

Fundamentally my object is the provision of a new treatment process and means for its accomplishment whereby enhanced results in the preservation of the desirable qualities of food stuffs, such as meat, during both storage as such, and tenderizing, are obtained with attendant economies. The more specific objects of my invention will be set forth hereinafter or will be apparent to one skilled in the art upon reading this specification, in which I set forth an exemplary embodiment of the invention.

Reference may be made to the drawing wherein:

Figure 1 is a diagrammatic representation of control means, and

Fig. 2 is a semi-diagrammatic sectional view of a treatment chamber.

It is known that ultraviolet radiation is of value, both in the tenderizing and in the storage of meats, though the use of unfiltered ultraviolet spectra from arc discharges involves certain dangers and disadvantages. In patents, Nos. 1,676,579 and 1,982,029 of which I am joint inventor, the use of filtered ultraviolet light is taught whereby bactericidal action and activation actions may be secured without the destructive effect of deleterious wave lengths. Both in the storage and for the tenderizing of meats, filtered ultraviolet radiation under the teachings of the said Letters Patent may be employed for protection, for the killing of surface and aerobic bacteria and for activation, without the production of those deleterious effects accompanying the use of the unfiltered ultraviolet spectra of arc discharges, such as destruction of taste, the production of foreign tastes, unwanted chemical action due to the presence of undue quantities of ozone, the destruction of enzymes and the rapid production of rancidity. Moreover, in the use of filtered ultra violet spectra in accordance with these teachings, the time element becomes wholly unimportant from the standpoint of deleterious actions which with unfiltered ultraviolet radiation have a time function.

So far as the present invention is concerned, it is known to irradiate meats with ultraviolet light before or during storage or tenderizing, for the control of surface and aerobic bacteria, for activation and for protection of the food stuffs from deleterious effects, including discoloration and the effects mentioned above.

Processes of treating meats whether or not they involve periods of holding at relatively more elevated temperatures, do involve low temperature treatments. For example, in packing houses after the animal is killed and the carcass dressed, it is subjected to a chill at relatively low temperatures, say well under 45° F., whether or not any extended period of storage is contemplated; and while the temperautre of the meat may necessarily rise during handling and distribution, yet storage periods are controlled to be at temperatures such as to prevent decomposition within the time cycles of the storage periods. In a packing house where meat is to be placed in storage in a room or compartment for a long period of time, the compartment may be equipped with means for maintaining a low storage temperature; but during the loading of the compartment and during the removal of meats from the compartment, considerable changes in temperature may occur. Similarly in the storage rooms of wholesale or retail markets, during the days' sales periods, the doors of the compartment will be frequently opened for the removal or addition of meat, and the temperatures in the compartment will usually be found to follow a distinctly cyclical curve, being relatively higher during daytime periods of activity in the market, and going down to relatively low temperatures at night, or at other times of interruption of market activity.

I have found that the irradiation of meats and other food stuffs with ultraviolet light is more effective at lower temperatures than at higher temperatures. In part, this may be due to decreased activity and resistance of microorganisms at low temperatures. Moreover, at low temperatures, chemical reactions, especially those which affect odor and flavor, are at a minimum. Moreover, most enclosed sources of ultra violet radiation produced by arc discharges, appear to give a more intense radiation of the ultraviolet under conditions of relatively low temperature.

In view of these discoveries, one aspect of my invention is the limitation of irradiation to periods of low temperature. Another aspect of my invention is the use of intense radiation for relatively shortened times at low temperatures. The use of high intensity radiation at low temperatures gives quicker sterilization and better general effects. Moreover, it enables me to limit drastically the periods of irradiation, thus saving in power consumed and the life of irradiation devices, and reducing the cost of operating the storage compartment by avoiding the undue production of heat therein.

My invention thus contemplates both storage and tenderizing treatments, in which at least the main irradiation is confined to relatively brief intervals at low temperatures in a variable or cyclical temperature system and procedure. The main irradiation is also preferably a high intensity irradiation, and under these circumstances it is readily possible to dispense with continuous irradiation, though under some circumstances a substantially continuous low intensity irradiation may be desired for the control of aerobic micro-organisms, and can be practiced without departing from my invention.

As a consequence in the practice of my invention, while I equip the treatment compartment with sources of ultraviolet light, preferably of the filtered character, I arrange for the operation of these sources at intervals, the duration of which is dependent upon the effect desired, but the occurrence of which is dependent upon the temperature. In practicing my invention, I provide means for so controlling the sources that they provide irradiation for controlled intervals when the temperature of the treatment compartment and the materials therein reach certain low values. Under conditions of prolonged storage at low temperatures which do not markedly vary, brief high intensity radiations may be desired automatically at stated intervals during the prolonged low temperature treatment, and my method and apparatus provide for this.

My invention is not dependent upon the use of any particular sources of ultraviolet radiation. I have already indicated outstanding advantages in the use of filtered ultraviolet. By way of a single example, I may provide the storage compartment with as many arc discharge tubes of the type shown in the co-pending application of Stirnkorb, entitled Light sources, Serial No 345,807, filed July 16, 1940, as may be required to produce the necessary irradiation effects, these tubes having uncoated envelopes of a character to act as filters for the production of spectra in accordance with the teaching of the patents herein mentioned; but other sources of ultraviolet radiation may also be employed.

In Fig. 2, I have shown at 1, an insulated compartment for the storage or tenderizing of meats. This compartment has one or more doors 2, giving access for loading or unloading. It will be fitted with cooling pipes or coils containing expanding refrigerant and indicated diagrammatically at 3. It also will contain sources of ultraviolet radiation 4, suitably mounted so that the irradiation will be effective on meat 5, which can be hung on hooks 6, on a suitable bar or rack 7.

The meat may be hung in the compartment without protection, and sufficient humidity maintained as is customary in storage compartments, to prevent undue drying and darkening of the meat. I prefer to enclose the meat in a tight envelope of material pervious to ultraviolet radiation as taught in my co-pending application entitled Method of tenderizing meat, Serial No. 342,543, filed June 26, 1940. The tight envelope prevents drying and darkening, but prevents humidity conditions in the storage compartment itself from affecting the meat. Moreover, it permits those economies attendant upon the operation of the refrigeration compartment dry, and further seals the meat against contamination by air borne micro-organisms. Further, since a sterile condition about the meat is maintained by the impervious envelope, the need of repeated sterilization is greatly minimized. The envelope may be of Cellophane, "Pliofilm" or the like, and may, if desired, be so treated as to be pervious only to the desired wave bands of the ultraviolet spectrum.

In Fig. 1, I have shown diagrammatically, an apparatus and circuit for the attainment of the effects set forth above. Power leads are shown at 8. Across these power leads I connect a constant speed motor 9, by leads 10. The motor may be, and preferably is, of the nature of a self-starting synchronous clock motor. It is shown with a shaft 11, on which an insulative disk 12 is frictionally mounted as at 13. The frictional engagement of the shaft and the disk is such that the disk may be stopped without stopping the rotation of the shaft; but the shaft will drive the disk if the disk is free. The disk is provided with an abutment or shoulder 14. A bar 15 is slidably mounted in supports not shown, and is provided with abutments 16 and 17, adapted to cooperate with the stop 14, but so spaced that only one of the stops can coact with the abutment at any one time.

The shaft 15 may be urged in one direction by a spring 18, or its equivalent. At the other end, the bar is provided with an armature 19, for an electro-magnet 20, having a coil 21. The disk 12 is designed to operate switch means for the light sources employed in the storage compartment. To this end I provide the disk with a conductive segment 22, adapted to cooperate with contact means 23 and 24, to close a circuit for the light sources. A light source has been indicated diagrammatically at 4, in combination with a box 25, which may be thought to contain suitable starting equipment for the light source. One terminal of the light source is connected to the contact means 23, by leads 26 and 27. The other terminal is connected to a thermostatic switch 28 located in the storage compartment, and adapted to close a circuit when the temperature falls below a predetermined value. The thermostatic switch 28 has a contact 29, connected to one of the power leads as shown. The contact 24 is connected by leads 30 and 31 to the other power source.

It will now be seen that the lamp and starting mechanism 4, 25 is connected across the power leads with two switches in series with it and with each other. One of these switches is the thermostatic switch 28, 29. The other is the timing switch 22, 23, 24. Operation of the lamp 4 can thus occur only when both switches are closed; the light source cannot be operated so long as the temperature in the storage compartment is above the predetermined value, and it will, in any event, be operated by the mechanism thus far described, only so long as is permitted by the timing switch 22, 23, 24.

To operate the timing switch, the coil 21 of the electro-magnet 20 is connected across the thermostatic switch as shown by leads 32 and 33. It will be evident that as the temperature falls and the thermostatic switch element 28 engages the contact 29, the coil 21 will be shorted and de-energized. In order to provide for its continuous energization at higher temperatures, I provide the thermostatic switch with a second and opposed contact 34, which is connected to the opposite power lead by a lead 35, in which there is an impedance 36, of such value as will not operate the light source 4 if its timing switch should be closed while the thermostatic switch remains open. Also since coil 21 shunts the thermostatic switch, I provide its circuit with an impedance 37 of sufficient value as not to cause the light source 4 to operate when the thermostatic switch is open. This impedance of course, may be the impedance of coil 21 or may be a separate or additional impedance.

With the thermostatic switch in the high temperature position as shown, the electro-magnet 20 is energized and the bar 15 is drawn to the right. The abutment 16 on the bar engages stop 14 as shown, and the rotation of the disk 12 is prevented. When however, the temperature falls, and the thermostatic switch element 28 comes into engagement with the contact 29, the coil 21 will be shorted and the electro-magnet 20 deenergized. Under these circumstances, the spring 18 will draw the bar 15 to the left, releasing the engagement of stop 16 and abutment 14. Under the influence of the shaft 11, the disk 12 will begin to rotate. The disk 12 is driven in a clockwise manner as indicated by the arrow and at a speed determined by the speed of the shaft 11.

Since the motor 9 is a synchronous motor, the shaft 11 is a timed shaft and with suitable gearing (not shown) may be caused to rotate the disk 12 at any desired rotative speed, and the area of segment 22 is chosen to give the desired length of time of high intensity radiation. During the rotation of disk 12, segment 22 makes contact with contact members 23 and 24. The light sources 4 are energized, and the irradiation treatment proceeds for the predetermined length of time. The disk 12 will rotate through substantially half a revolution, whereupon the abutment 14 comes into contact with the stop 17 and the rotation of the disk is stopped. The area and placement of the segment 22 is such that this stoppage of the disk will occur when the segment 22 has passed the contact members 23 and 24. The light sources will have been turned off and they will not go on again through the operation of the mechanism thus far described, so long as thermostatic switch 28, 29 remains closed.

If, however, the temperature should rise, the thermostatic switch 28, 29 will open. This will reenergize the coil 21 and cause the electro-magnet 20 to draw the bar 15 to the right. Stop 17 will then disengage abutment 14, and the disk 12 will again begin to rotate, this time performing the other half of the revolution. The rotation will continue until abutment 14 again engages stop 16. During this half of the rotation the segment 22 will be opposite the contact means 23 and 24, and the light source circuit will not be re-established. Thus the operation of reenergizing the coil 21 has the effect of re-setting the timing mechanism for another controlled-duration treatment, when and if the temperature in the treatment compartment again falls below the predetermined value for which the thermostatic switch is set.

As I have hereinabove indicated, during periods of continued storage at low temperatures, periodic brief irradiation may be desired for the control of micro-organisms. Therefore, where such prolonged periods of storage are likely to occur, I also provide means for the automatic occurrence of such brief irradiation periods. Means are indicated in Fig. 1 for this purpose, where shaft 11 is connected through certain gears 38, to a shaft 39, to which another disk 40 is non-rotatably attached. It will be understood that this disk rotates continuously, and the purpose of the gears 38, or their equivalent, is to cause it to rotate in such timed relationship as will control the desired intervals. For example, under some conditions an automatic brief period of irradiation may be desired once every forty-eight hours. Under other conditions, an irradiation once a week may be found sufficient. The disk 40 bears a segment 41 coacting with contact elements 42 and 43, which are connected in parallel with the contact elements 23 and 24. Once during each revolution of the disk 40, contact will be established between elements 42 and 43; but the light sources will be activated only if the thermostatic switch 28, 29 is closed. In other words, in spite of the operation of the last mentioned elements, the automatic cycle of regularly recurring brief treatments will be followed only if, and so long as, the temperature of the storage compartment remains below the predetermined figure for which the thermostatic switch is set. It is convenient to provide a switch 44 in the circuit of contact elements 42 and 43, so that the automatically recurring irradiations may be eliminated, if desired, as for example, during periods when the storage compartment is empty.

While I have described mechanism suitable for producing the effects to which my invention is directed, it will be understood that other mechanism may be employed by the worker in the art, and that the mechanism may be widely varied without departing from the process as set forth in the appended claims, My invention contemplates the treatment of meats and other food products under circumstances where the temperature is variable with brief periods of intensive radiation at or near the beginning of a low temperature. It will be clear from the explanation I have given, how this is of advantage both in the storage of meats and in tenderizing processes.

My invention in one of its aspects, contemplates the provision of means whereby the attainment of a low temperature controls the application of the relatively brief and high intensity irradiation. In another aspect, it contemplates the automatic resterilization of the products during continued long temperature storage. I have found not only that the economies hereinabove set forth attend my process, but also that the application of relatively brief and relatively high intensity irradiation applied only at low temperatures, say below 45° F., gives better product results both in tenderizing and in storage. Whether in tenderizing or in storage, automatic treatments are assured, under conditions sufficient to retain sterility without wasting power during periods when continuous change of atmosphere is occurring in the storage compartment, and without tending to increase the temperature in the storage compartment during high temperature periods of operation.

Modifications may be made in my invention without departing from the spirit of it.

Having thus described my invention, what I claim as new and desire to secure by Letters Patent is:

1. A process of tenderizing meats which comprises maintaining the meats under conditions of temperature subject to variation above and below 45° F. and irradiating the meats with ultra-violet light, the said irradiation being confined in point of time to a temperature condition not exceeding 45° F.

2. A process of treating food stuffs which comprises maintaining said food stuffs under conditions of substantially cyclical variation of temperature and irradiating said foods stuffs with ultraviolet light, the periods of irradiation being confined to the low temperature portions of said cyclical variation.

3. A process of treating food stuffs which comprises maintaining said food stuffs under conditions of substantially cyclical rise and fall in temperature, and automatically irradiating said food stuffs with ultraviolet light at times depending upon the attainment by said food stuffs of a predetermined temperature in the low temperature portion of the said cyclical variation.

4. A process of treating meats which comprises maintaining said meats under conditions of variable temperature, and automatically irradiating said meats with ultraviolet light upon the attainment of said meats of a predetermined temperature in the low temperature portions of said cyclical variations.

5. A process of tenderizing meats which comprises storing meats under cyclical conditions of temperature varying from below to above 45° F. and periodically subjecting said meats to high intensity ultra violet radiation, the periods of said radiation being confined to temperatures below 45° F.

6. The process as set forth in claim 5 wherein the ultraviolet radiation is confined to wave lengths not substantially shorter than 2750 angstrom units.

7. A process of tenderizing meats which comprises storing meats under conditions of temperature variable above and below a predetermined temperature and causing the attainment by said meats of a predetermined low temperature from a higher temperature to initiate a period of irradiation of said meats by ultraviolet light, and limiting the duration of said period of irradiation in accordance with a predetermined time cycle in spite of the maintenance of said low temperature, said time cycle being shorter in duration than the expected duration of temperature below said predetermined temperature.

8. A process of tenderizing meats which comprises storing meats under conditions of temperature variable above and below a predetermined temperature, irradiating said meats for a predetermined time interval, each time said meats during storage reach a predetermined low temperature from a higher temperature, and preventing the irradiation of said meats at higher temperatures during said storage period.

9. A process of tenderizing meats which comprises storing said meats under conditions of variable temperature, irradiating said meats with ultraviolet light only when said meats attain a predetermined low temperature in the lower range of said conditions, and for a predetermined length of time in spite of the maintenance by said meats of said low temperature.

10. A process of tenderizing meats which comprises storing said meats under conditions of variable temperature, irradiating said meats with ultraviolet light only when said meats attain a predetermined low temperature in the lower range of said conditions, and for a predetermined length of time in spite of the maintenance by said meats of said low temperature, but during said maintenance of the predetermined low temperature periodically irradiating said meats.

11. A process of tenderizing meats during storage at varying temperatures, which comprises non-continuously irradiating said meats with ultraviolet light during said storage, the periods of irradiation having a fixed duration, but occurring only while said meats are at or below a predetermined temperature in the lower range of said varying temperatures, said irradiation treatments being arranged to recur at predetermined intervals during a maintenance of said predetermined or lower temperature.

12. A process of treating meats which comprises enclosing meats in wrappers pervious to ultraviolet light but substantially impervious to air, moisture, and air-borne micro-organisms, and storing the meats so treated under conditions of varying temperature, irradiating said meats with ultraviolet light while confining the periods of irradiation to predetermined time durations, while causing said periods of irradiation to occur only at such times as the meats have attained a temperature not higher than a predetermined low temperature, lower than the highest temperature in said varying temperature conditions.

13. The process of claim 12 in which the ultraviolet radiation allowed to impinge on said meats is confined to wave lengths not shorter than 2750 angstrom units.

14. An apparatus for treating meats comprising a storage compartment subject to temperature variations, cooling means for said storage compartment, ultraviolet irradiation means and means for producing intense activity of said ultraviolet producing means only upon the attainment in said storage compartment of a predetermined temperature, in the lower portion of said temperature variations.

15. An apparatus for tenderizing meats, a storage compartment, cooling means for said storage compartment, ultraviolet radiation means, a power supply and a thermostatic switch connected with said power supply in such a way as to cause activation of said ultraviolet producing means upon the attainment of a predetermined low temperature lower than the highest temperature encountered therein.

16. An apparatus for tenderizing meats, a storage compartment, cooling means for said storage compartment, ultraviolet radiation means, a power supply and a thermostatic switch connected with said power supply in such a way as to cause activation of said ultraviolet producing means upon the attainment of a predetermined low temperature lower than the highest temperature encountered therein, and timing means also in connection with said power supply for confining the periods of activation to predetermined time intervals.

17. An apparatus for tenderizing meats, a storage compartment, cooling means for said storage compartment, ultraviolet radiation means, a power supply and a thermostatic switch connected with said power supply in such a way as to cause activation of said ultraviolet producing means upon the attainment of a predetermined low temperature, and timing means also in connection with said power supply for confining the periods of activation to predetermined time intervals, and supplementary timing means also in connection with said power supply for producing recurrent activation of predetermined duration but only during a continuation of said low temperature.

18. A process of tenderizing meats which comprises repeatedly irradiating said meats with ultraviolet light at temperatures substantially below 45° F., while storing said meats under variable temperature conditions in which the temperature is permitted to rise above substantially 45° F.

19. A process of tenderizing meats which comprises irradiating said meats with ultraviolet light at temperatures substantially below 45° F., and storing said meats under variable temperature conditions in which the temperature is permitted to rise above substantially 45° F., and repeating the irradiation treatment at intervals dependent upon the retainment of said meats of said temperatures below substantially 45° F.

20. A process of tenderizing meats which comprises irradiating said meats with ultraviolet light having an effective wave length not shorter than 2750 angstrom units, and at temperatures not greater than substantially 45° F., said meats being permitted to rise in temperature during intervals of no irradiation.

21. A process of tenderizing meats which comprises storing meats under conditions of temperature subject to variation above and below a predetermined temperature, and causing a falling condition of temperature, when it attains said predetermined temperature to initiate a non-continuous and self-concluding period of irradiation of said meats by ultraviolet light, whereby substantially to confine the irradiation of said meats to the lower temperature portions of said varying temperature conditions.

GEORGE SPERTI.